United States Patent Office 3,488,123
Patented Jan. 6, 1970

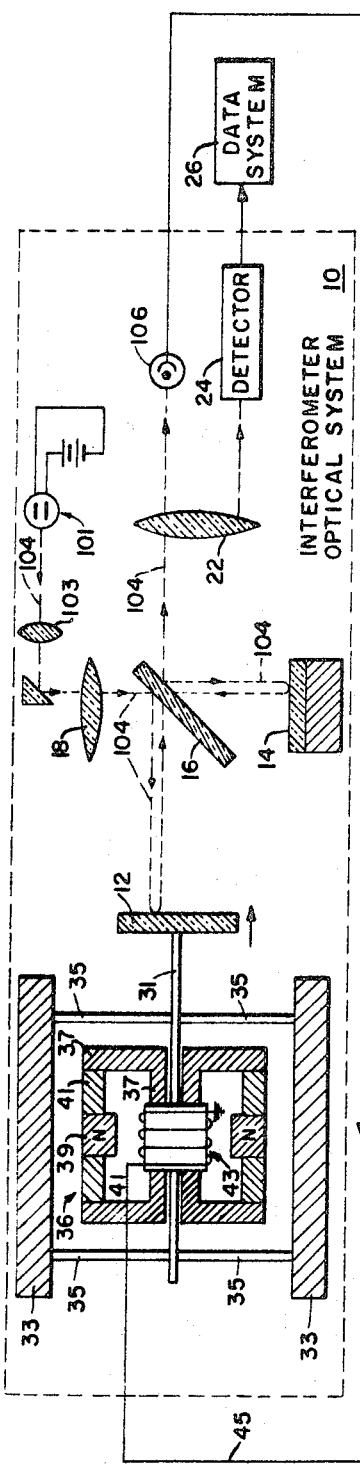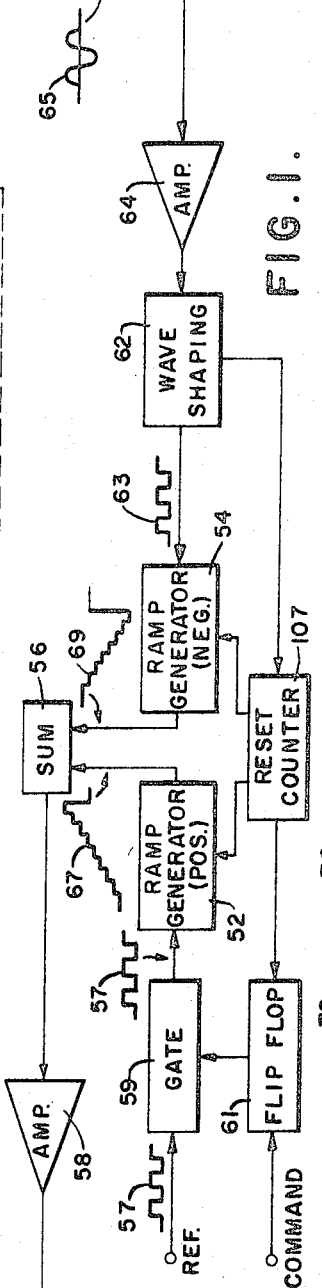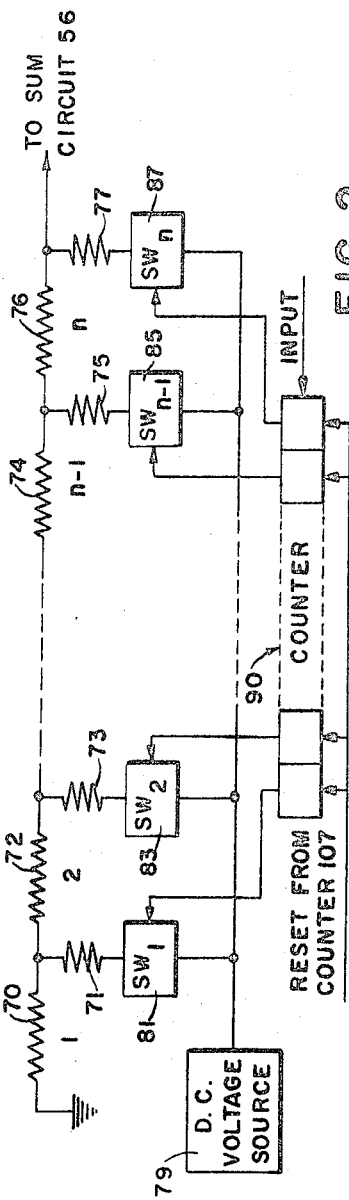

3,488,123
APPARATUS FOR CONTROLLING THE VELOCITY OF AN ELECTROMECHANICAL DRIVE FOR INTERFEROMETERS AND THE LIKE
Grady B. Nichols, Lanham, Md., assignor to the United States of America as represented by the Administrator of the National Aeronautics and Space Administration
Filed Mar. 28, 1966, Ser. No. 538,913
Int. Cl. G01b 9/02
U.S. Cl. 356—106                                    6 Claims

ABSTRACT OF THE DISCLOSURE

Apparatus for providing velocity control of the electromechanical drive mechanism of the scanning mirror of an interferometer, wherein a signal proportional to the linear velocity of the mirror is derived from the interferometer and is fed to a comparator, which also receives a reference signal of the same character. The output of the comparator is supplied to the energizing coil of the electromechanical drive mechanism to provide corrective action, resulting in a constant linear velocity for the movement of the scanning mirror.

---

The invention described herein was made by an employee of the United States Government and may be manufactured and used by or for the Government for governmental purposes without the payment of any royalties thereon or therefor.

This invention relates generally to interferometers, and more particularly to apparatus for accurately controlling the velocity of the electromechanical drive mechanism for the movable mirror of interferometers to be used for interference spectroscopy.

For the purposes of the present application the term "radiation" is applicable to the optical and near optical portions of the electromagnetic spectra, particularly the infrared portion thereof. Accordingly, the use of terms "optical," "light," "light rays," "light beam," and the like are not to be taken as limited to the visible portions of the spectra.

The term "electromechanical drive" as used herein denotes a type of electromagnet wherein there is provided relative motion between a coil and a magnetic core upon applying an electric current to the coil.

Interference spectroscopy, first suggested by Michelson after the development of his original interferometer, had not been pursued to any great extent in the past because of extreme difficulties in the computation and evaluation of data. However, with the advent of high speed digital computers and auto-correlation techniques, the past decade has seen significant advances in the art of interference spectroscopy. Also in recent years, advances in space technology has made it possible to carry an interferometer aboard a spacecraft to thereby enable a variety of scientific investigations of the atmosphere and the surface of the earth and of other planets to be conducted.

One of the basic instruments used for such investigations is a modiled Michelson interferometer. When it is to be used for interference spectroscopy the movable mirror assembly is arranged to be driven in a path normal to its reflecting surface. This provides a scanning motion such that the detected energy distribution profile of incident radiation is related to the distance travelled by the mirror, and when the incident radiation contains a wide spectral range this profile is a Fourier cosine transform. Computation and analysis of the Fourier transform provides information concerning each spectral element of the incident radiation.

Lack of uniformity in the drive speed of the mirror has deleterious effects on the accuracy, quality and usefulness of the data obtained from the instrument of the above described type. As an illustrated example, when used in conjunction with an infrared experiment carried aboard a spacecraft, and taking into consideration the desired resolution of the instrument, the signal-to-noise ratio of the detector for the radiation profile and the format of the telemetry system used on board the spacecraft, it is essential that the mirror velocity be maintained constant at 0.2 millimeter per second within ±1% for a 10-second data frame.

Prior art interferometers have generally used mechanical arrangements for the mirror drive, or in some instances an electromechanical drive arrangement wherein the current through a movable coil, or the coil of a magnetostructive element, has been used to cause the desired mirror movement. The former arrangement is usually a manual adjustment for laboratory instruments, nor suitable for remote control as required for use on board a spacecraft. Prior art techniques to implement the latter arrangement are subject to circuit parameter changes resulting from component aging, temperature variations, and other environmental conditions. If adapted for spacecraft use such changes would require additional information to be telemetered so that appropriate corrections can be made of the data. This would add additional complexity to the on board equipment required by the spacecraft and would place extra demands on spacecraft telemetry system and power sources.

The present invention provides velocity control of the electromechanical drive mechanism of a Michelson interferometer that produces a uniform, constant movement of the mirror, thus resulting in an instrument having increased accuracy for interference spectroscopy. The velocity control apparatus is efficient, reliable, and results in a mirror drive that does not vary in accuracy with component aging or changing environmental conditions. This is particularly advantageous when the instrument is to be carried aboard a spacecraft for investigation of the surface and the atmosphere of the earth and other planets.

Broadly, there is provided means associated with a Michelson interferometer for developing an electrical signal having a parameter proportional to the velocity of a mirror adapted to be moved by an electromechanical drive mechanism. This signal is fed to a comparator, which also receives a reference signal of the same character. The output of the comparator, which is indicative of the difference between its two input signals, is supplied to the energizing coil of the electromechanical drive mechanism for the mirror. When the mirror velocity is constant there is no output from the comparator; when it varies from a selected constant value the comparator provides a difference signal for corrective action.

More specifically, the mirror drive control apparatus of the invention includes two digital-to-analog voltage ramp generators that feed a sum circuit. The output of the sum circuit is coupled, via an amplifier, to the mirror drive coil. The first ramp generator provides a positive-going voltage in response to a reference clock signal, as for example, a square wave pulse train of constant repetition rate. The second ramp generator provides a negative-going voltage in response to a digital signal having a frequency component proportional to the mirror velocity, as for example, a square wave pulse train of variable repetition rate. The output of the sum circuit is such that no current is applied to the mirror drive coil when the mirror velocity is constant at a selected rate, and an impulse of electrical current providing corrective action is applied to the mirror drive coil when the mirror velocity varies from the constant rate. The digital signal having a frequency proportional to mirror velocity may be developed by a monochromatic light source and an auxiliary detector responsive to the optical system of the interferometer to provide a sine wave having a frequency proportional to mirror velocity. This sine wave is then processed to provide a digital signal of an appropriate waveform.

The various objects, as well as the features and attending advantages of the present invention will be more fully appreciated from the following description, considered in conjunction with the accompanying drawings, in which:

FIGURE 1 is a diagrammatic representation of a Michelson type interferometer illustrating the basic principles of the invention;

FIGURE 2 is a circuit diagram of a typical ramp generator which may be used in conjunction with FIGURE 1.

Considering now the illustrated embodiment of FIGURE 1, numeral 10 refers to the optical system of an interferometer, which for the purposes of this invention may be a Michelson interferometer or Twyman-Green variations thereof. Instruments of this type are well known in the art and need not be described in detail. Briefly, the basic elements of these interferometers include a movable mirror 12, a fixed mirror 14 and a beam splitter 16. Mirrors 12 and 14 provide reflecting surfaces that are normal to one another, and beam splitter 16 is positioned to provide surfaces at a 45° angle to each mirror reflecting surface. A suitable focusing lens 18 directs incident radiation at a 45° angle onto beam splitter 16. There is also provided a collecting lens 22 to direct radiation onto a suitable detector 24, such as a photocell or infrared bolometer. Incident radiation is focused on beam splitter 16 where it is divided equally and transmitted to mirrors 12 and 14, and thence reflected back to be recombined at beam splitter 16. The recombined radiation is then transmitted to condensing lens 22 and hence to detector 24. For purpose of simplicity of the drawings the incident radiation from lens 18 and its subsequent path through optical system 10 is not shown. It is to be understood that when the interferometer is to be used in conjunction with space exploration lens 18 may be an integral part of a telescope directed towards the atmosphere or the surface of various planets, and that the radiation received therefrom encompasses a broad spectrum, including infrared radiation.

It should also be noted that when used for interference spectroscopy movable mirror 12 is to be driven at a constant velocity over a specified distance in a direction normal to its reflecting surface. During this movement the relative constructive and destructive interference of a broad spectrum of radiation modulates the radiation directed on detector 24. The output of detector 24, which provides a signal representing a Fourier cosine transform, is supplied to suitable electronic circuitry such as a data system 26 so that it may be telemetered to a remote point for further processing and analysis.

The electromechanical drive for movable mirror 12 includes a non-magnetic rod 31 extending perpendicular from the rear of its reflecting surface. Rod 31 is suspended from a suitable frame 33 by four parallel leaf springs 35. Rod 31 is also surrounded by an electromagnet assembly 36, which is shown partially in cross-section for clarity of illustration. The magnetic core of electromagnet assembly 36, which includes poles pieces 37 and 39 and permanent magnets 41, is secured to frame 33 by any suitable means (not shown). Rod 31 is free to move relative to pole piece 37. Coil 43, which surrounds and is also free to move relative to pole piece 37, is secured to rod 31. Coil 43 is energized by an electrical impulse of appropriate waveform via lead 45. This arrangement sets up a strong magnetic field perpendicular to the longitudinal axis of rod 31 (and coil 43) such that an electrical impulse applied to coil 43 produces an electrodynamic action that causes mirror 12 to move in a direction normal to the magnetic field, that is, in a direction parallel to the longitudinal axis of rod 31.

The control system for energizing coil 43 in a manner that maintains the velocity of movable mirror 12 constant includes voltage ramp generators 52 and 54, one feeding sum circuit 56 with a positive-going ramp voltage and the other feeding sum circuit 56 with a negative-going ramp voltage. Sum circuit 56 may be any resistive summing network that provides an output signal which is the algebraic sum of two (or more) analog input voltages. The output of sum circuit 56 is supplied to amplifier 58 and thence to lead 45 to energize coil 43.

A reference square wave voltage, represented by waveform 57, is fed through gate 59 to provide an input for ramp generator 52. The reference square wave voltage 57 may be derived from any stable oscillator, such as the type usually provided as the clock for spacecraft telemetry systems. Gate 59 is opened by the output of flip-flop 61, which flip-flop may be triggered by a command pulse.

A second square wave voltage, represented by waveform 63, is derived from wave shaping network 62 and supplied to ramp generator 54. As will be subsequently discussed, the input signal for wave shaping network 62 is obtained, via amplifier 64, from optical system 10 of the interferometer in the form of a sine wave (represented by waveform 65) having a frequency proportional to the velocity of movable mirror assembly 12. Wave shaping network 62 may include any suitable circuit arrangement to provide a square wave in response to and related to the frequency of a sine wave input voltage. For example, wave shaping network 62 may include a Schmitt trigger followed by one or more binary countdown circuit elements to provide the square wave voltage represented by waveform 63.

Ramp generators 52 and 54 may be any suitable voltage ramp generators operable to provide an analog output voltage varying linearly in time in response to an input square wave pulse train. One such circuit is representatively shown in FIGURE 2, and provides incremental voltage steps of equal magnitude for each input pulse. By making each voltage step small with respect to the total range of the output voltage rise, a staircase waveform that approximates a ramp voltage, as representatively shown by waveforms 67 and 69, is produced. The slope of this ramp is linear and constant for a constant frequency square wave input; and the slope varies instantaneously with time for a changing frequency input square wave.

Considering the ramp generator of FIGURE 2 in more detail, there is provided a resistor ladder network including a number of pairs of series and shunt resistors, such as resistors 70 and 71, 72 and 73, 74 and 75, 76 and 77, etc. One end of the series string of resistors 70, 72, 74 and 76, etc., is connected to a reference potential such as ground and the other end of this series string provides an output voltage waveform that is supplied to sum circuit 56. Each shunt resistor 71, 73, 75 and 77, etc., is returned to voltage source 79 by electronic switches 81, 83, 85 and 87, etc. Typically each of these switches may be transistor or similar semiconductor device. There is accordingly provided a voltage divider of 1, 2 . . . n−1, n sections with a dividing ratio that may be changed by activating one or more switches in series with the shunt resistors of selected sections.

To accomplish the selection, various stages of binary counter 90 are utilized to trigger switches 81, 83, 85 and 87, etc., as a count of the input square wave pulses is stored. This is the input square wave voltage derived from gate 59 or wave shaping network 62, as the case may be. Counter 90 may be any of the usual type wherein a series of interconnected bistable elements change state in an ordered sequence as input pulses are counted. The various stages of counter 90 are then utilized to trigger switches 81, 83, 85 and 87, etc., in the same ordered sequence. This selectively varies the voltage dividing action produced by the series and shunt resistors of the ladder network such that the level of the waveform of appearing at the junction of resistors 76 and 77 increases in equal incremental steps as the number of input pulses received from either gate 59 (for ramp generator 52) or wave shaping network 62 (for ramp generator 54) increases. The result is a linear staircase voltage wave which approaches a linear ramp voltage for small increments of change, as represented by waveforms 67 and 69. The ramp voltage may be either positive-going or a negative-going, depending on the polarity of voltage source 79. In addition, by proper selection of the values of the series and shunt resistors of the ladder network, ramp voltages of the same slope may be generated in response to input square wave pulses having different constant frequencies, and this slope may be adjusted to any desired value.

As has been mentioned, the square wave voltage input for ramp generator 54 is derived from a sine wave having a frequency proportional to the velocity of movable mirror 12. Thus, with further reference to FIGURE 1, optical system 10 of the interferometer also includes a source of monochromatic light, such as neon lamp 101 acting in conjunction with filter 103. As illustrated by arrows 104, this monochromatic light is directed onto a portion of beam splitter 16, where it is transmitted to and reflected from mirrors 12 and 14 to be recombined for constructive or destructive interference in accordance with the above mentioned interferometer principles. A portion of lens 18, or if desired a separate focusing lens, may be used to direct the monochromatic light from neon light 101 onto beam splitter 16.

After being recombined at beam splitter 16 the monochromatic light is directed by a condensing lens onto detector 106, such as a silicon photovoltaic cell. The condensing lens may be a portion of lens 22, or a separate lens. The output of detector 106 is fed to amplifier 64 and thence to wave shaping network 62. When mirror 12 is moving at a constant velocity the constructive and destructive interference of the monochromatic light results in a detected signal at the output of detector 106 which is a sine wave, with the frequency of this sine wave proportional to the velocity of mirror 12. This sine wave may then be shaped by wave shaping network 62 and supplied to ramp generator 54 as a square wave voltage having a repetition rate proportional to the mirror velocity.

In order to de-energize the driving coil for movable mirror 12 after it has moved a desired distance, the output of wave shaping network 62 may also be supplied to a reset counter 107, which may be of the usual type wherein a single output pulse is produced in response to a selected number of input pulses. Thus, after a predetermined number of pulses have been counted, reset counter 107 provides an output pulse which is utilized to reset ramp generators 52 and 54 (for example, to clear counter 90 of FIGURE 2), and to trigger flip-flop 61 to close gate 59.

Considering the operation of the illustrative embodiment of FIGURE 1, assume that movable mirror 12 is initially in a rest condition and a scan cycle is commenced by applying a command pulse to flip-flop 61. This opens gate 59 to allow the reference square wave voltage (waveform 57) to be supplied to ramp generator 52 and the output of ramp generator 52 is applied to sum circuit 56. At this time sum circuit 56 receives no output from ramp generator 54, and accordingly an impulse related to the initial buildup of the ramp voltage of ramp generator 52 is amplified and supplied to coil 43. This imparts an initial velocity to movable mirror 12, with the magnitude of the initial velocity determined by the rate of build-up of the ramp voltage.

Once mirror assembly 12 is in motion there is a varying interference pattern of the monochromatic light which is detected as a sine wave having a frequency proportional mirror velocity. This sine wave is processed by wave shaping network 62 and supplied as a square wave (waveform 63) to ramp generator 54. The ramp voltage appearing at the output of ramp generator 54 is combined (algebraically added) with the output of ramp generator 52 in sum circuit 56. When the mirror velocity is constant at a predetermined rate the two ramp voltages are equal and opposite and the mirror continues to move at the initial velocity. If the velocity of the mirror changes the two ramp voltages are no longer equal and opposite, and a difference signal is applied as an impulse to coil 43 for corrective action. For example, if at any instant in time the mirror velocity is too slow, the slope of the ramp voltage provided by ramp generator 54 is less than that of ramp generator 52, and an impulse of the same polarity as the output of ramp generator 52 tends to accelerate the mirror. If, on the other hand, the mirror velocity is too fast an impulse of a polarity opposite to the output of ramp generator 52 tends to decelerate the mirror. After reset counter 107 counts a predetermined number of pulses from wave shaping network 62, indicating the end of a scan cycle, it provides a pulse that resets ramp generators 52 and 54, and at the same time triggers flip-flop 61 to a state that closes gate 59. Mirror assembly 12 then returns to its rest position and awaits the initiation of another scan cycle by a command pulse applied to flip-flop 61.

While a specific embodiment of the invention has been described with particularity for the purpose of explaining the invention, it is not to be so limited, and modifications and variations thereof should be obvious to those skilled in the art. It is therefore to be understood that within the scope of the appended claims the invention may be practiced otherwise than specifically set forth.

What is claimed as new and desired to be secured by Letters Patent of the United States is:

1. In an interferometer having a light dividing element, a pair of reflecting elements spaced about the dividing element to receive separate light rays from the dividing element and to reflect them back to the dividing element for recombination, one of said reflecting elements being movable, and means for providing an electrical signal in response to the recombined light rays, the combination comprising:

electromechanical drive means including an energizing coil for translating said movable reflecting element along an axis normal to its reflecting surface;

means for developing a first electrical signal proportional to the translational velocity of said movable reflecting element along said axis;

means providing a reference signal independent of said first electrical signal;

means for comparing said first electrical signal with said reference signal to provide a difference signal;

and means for applying said difference signal to said energizing coil to thereby impart a constant translational velocity to said one reflecting element along said axis.

2. The combination of claim 1 wherein said first electrical signal is a periodic signal having a frequency component proportional to the translational velocity of said movable reflecting element, and said reference signal is a periodic signal having a constant frequency component.

3. The combination of claim 2 wherein said means for developing said first electrical signal includes means for directing monochromatic light rays onto said light dividing element to provide a periodic electrical signal having a frequency component proportional to the translational velocity of said movable reflecting element.

4. The combination of claim 2 wherein said means for comparing said first electrical signal with said reference signal includes:

first circuit means including a first ramp generator responsive to said first electrical signal to produce a first ramp voltage waveform of a first polarity;

second circuit means coupled to said second ramp generator responsive to said reference signal to produce a second ramp voltage waveform of a second polarity opposite to said first polarity;

and third circuit means for comparing said ramp voltage waveforms to thereby provide said difference signal.

5. The combination of claim 4, and further including gating circuit means coupled to said second ramp generator for enabling the application of said reference signal to said second circuit means.

6. The combination of claim 5, and further including means connected between said means for developing a first electrical signal and said first and second circuit means responsive to said first electrical signal to reset said first and second circuit means and to disable the application of said reference signal to said second circuit means after a predetermined number of cycles of said first electrical signal.

References Cited

UNITED STATES PATENTS

| | | | |
|---|---|---|---|
| 2,641,706 | 6/1953 | Dickinson | 250—36 |
| 3,098,970 | 7/1963 | Smith | 324—70 |
| 3,248,648 | 4/1966 | Carroll et al. | 324—70 |
| 3,286,582 | 11/1966 | Mertz | 88—14 |

RONALD L. WIBERT, Primary Examiner

CONRAD CLARK, Assistant Examiner